United States Patent [19]
Zimmermann et al.

[11] Patent Number: 5,857,158
[45] Date of Patent: Jan. 5, 1999

[54] CONTROL UNIT AND DEVICE FOR PROGRAMMING IT

[75] Inventors: Jürgen Zimmermann, Vaihingen; Walter Grote, Markgröningen, both of Germany

[73] Assignee: Robert Bosch GmbH, Stuttgart, Germany

[21] Appl. No.: 495,589

[22] PCT Filed: Dec. 16, 1994

[86] PCT No.: PCT/DE94/01515

§ 371 Date: Jul. 13, 1995

§ 102(e) Date: Jul. 13, 1995

[87] PCT Pub. No.: WO95/18404

PCT Pub. Date: Jul. 6, 1995

[30] Foreign Application Priority Data

Dec. 29, 1993 [DE] Germany .......................... 43 44 866.6

[51] Int. Cl.⁶ .............................................. G05B 19/042
[52] U.S. Cl. ............................................ 701/33; 701/115
[58] Field of Search ...................... 364/424.038, 431.04, 364/431.12, 551.01; 395/430, 182.01; 701/33, 102, 115; 711/100

[56] References Cited

U.S. PATENT DOCUMENTS

| | | | |
|---|---|---|---|
| 4,716,349 | 12/1987 | Koyokawa et al. .................. 318/562 |
| 4,751,633 | 6/1988 | Henn et al. ............................. 364/200 |
| 4,951,235 | 8/1990 | Mori ....................................... 364/550 |
| 5,138,548 | 8/1992 | Kienle .................................... 395/425 |
| 5,138,696 | 8/1992 | Nagata .................................... 395/110 |
| 5,278,759 | 1/1994 | Berra et al. ....................... 364/424.01 |
| 5,349,689 | 9/1994 | Suzuki .................................... 395/800 |
| 5,473,540 | 12/1995 | Schmitz ............................ 364/424.05 |

*Primary Examiner*—Michael Zanelli
*Attorney, Agent, or Firm*—Michael J. Striker

[57] ABSTRACT

The control unit, especially a motor vehicle control unit, includes a microcomputer (13), a programmable nonvolatile memory (14) connected with or integrated in the microcomputer (13), a serial interface (15) for the microcomputer (13) to which a serial data transmission line (12) can be connected over which data for programming the programmable nonvolatile memory (14) is received in the microcomputer from an external programming unit (11), and a low pass filter connected to a terminal (16) for the serial data transmission line. The low pass filter includes components that produce a signal for enabling the programming of the programmable nonvolatile memory (14) of the external programming unit is connected to the control unit via the serial data transmission line (12). These components preferably include a first resistor (R2) connected between the terminal (16) and a programming-enabling input (19) of the microcomputer (13), a capacitor (C1) connected between the programming-enabling input (19) and ground and a second resistor (R1) connected to ground between the capacitor (C1) and the programming-enabling input.

16 Claims, 2 Drawing Sheets

CONTROL UNIT AND DEVICE FOR PROGRAMMING IT

BACKGROUND OF THE INVENTION

The present invention relates to a control unit including a microcomputer and a programmable nonvolatile memory and, more particularly, to a motor vehicle control unit including a microcomputer and programmable nonvolatile memory.

A control unit and a device for programming it are already known from EP 0 266 704 A2. In this case an external programming unit is provided for programming the nonvolatile memory of the control unit. The external programming unit is connected to the control unit via a serial transmission line. The data to be programmed are transmitted to the control unit via this serial transmission line. The microcontroller of the control unit receives the data and then programs them into the nonvolatile memory to be programmed. To this end, the necessary programming voltage is fed to the control unit via a separate connection between the programming unit and control unit. Therefore, there is a separate input pin provided at the control unit, to which input pin the programming voltage can be applied from the outside.

It is also known to generate the programming voltage internally in the control unit. The programming process is initiated using control instructions which are transmitted to the control unit via the serial transmission line. It is disadvantageous here that as a result of electromagnetic interference the program sequence of the control unit may be arbitrarily altered so that it is not ensured that the programming of the nonvolatile memory cannot be initiated wrongly.

SUMMARY OF THE INVENTION

It is an object of the present invention to provide a control unit and device for programming it of the above-described types that do not have the above-described disadvantages.

According to the invention the control unit comprises
  a microcomputer,
  a programmable nonvolatile memory connected with or integrated in the microcomputer,
  a serial interface for the microcomputer to which at least one serial data transmission line is connectable over which data for programming the programmable nonvolatile memory is received in the microcomputer from an external programming unit, and
  a low pass filter connected to a terminal for the at least one serial data transmission line, the low pass filter including means for producing a signal for enabling the programming of the programmable nonvolatile memory if the external programming unit is connected to the control unit via the at least one serial data transmission line.

The control unit according to the invention has, in contrast, the advantage that, on the one hand, it is not necessary to provide an additional control-unit pin for enabling the programming at the control unit and, on the other hand, arbitrary initiation of the programming of the nonvolatile memory of the control unit cannot be triggered by a fault in the program sequence of the control unit.

Advantageous developments and improvements to the control unit disclosed in the main claim are possible by virtue of the measures specified in the subclaims. Furthermore, the advantages of the device according to the invention for programming the control unit according to the invention are disclosed.

It is particularly advantageous that the enabling signal for the programming is extracted from the serial transmission line via a low pass filter consisting of a resistor and capacitor. As a result, it is possible for the enabling signal to continue to be present at the memory even during a data transmission and for the sequencing of the programming to take place independently of the transmission of data via the serial transmission line.

It is also advantageous that a resistor is connected to ground downstream of the low pass filter between the capacitor and the programming-enabling input of the nonvolatile memory.

It is particularly advantageous when the signal for enabling programming is input to a charging pump that applies a programming voltage to the nonvolatile memory in response to that signal if the nonvolatile memory requires a higher voltage (e.g. 12 V) for the programming process.

Furthermore, it is advantageous that an input resistor is connected to the transmission line in the control unit, which input resistor is connected at the other end to the supply voltage line (ground). As a result it is ensured that the input line retains a defined low potential when the serial transmission line is not connected to the control unit. The nonvolatile memory is thus prevented from being unlocked during the normal operation of the control unit, i.e. when there is no external programming unit connected to the transmission line.

It is also advantageous that the timing constant of the low pass filter is selected to be so large that during the transmission of a data word the capacitor is not discharged to the extent that the enabling signal for programming drops in terms of its level below a predetermined minimum value. As a result, it is ensured that the enabling signal is continuously present even during the transmission of data to or from the control unit so that the programming process can take place without disturbance.

It is also advantageous that the timing constant of the low pass voltage is selected to be so small that the capacitor is completely charged in the phases available between the transmissions of two data words. This measure also has the result that the enabling signal is continuously present at the nonvolatile memory so that undisturbed programming of the nonvolatile memory can also take place during the transmission of data.

Moreover, it is advantageous that a Schmitt trigger is connected into the transmission line internally in the control unit. Signal-preparation of the signals received via the transmission line is carried out by the Schmitt trigger. In particular, level-adaptation is possible as a result of this, and also regeneration of the steepness of the signal edges.

Furthermore, it is advantageous that a driver stage is connected upstream of the resistor of the low pass filter in order to extract the enabling signal for programming a driver stage. The driver stage serves to relieve the Schmitt trigger and to isolate the transmission line from the line which transmits the enabling signal to the nonvolatile memory.

It is also advantageous that a resistor is provided between the Schmitt trigger and the connection of the transmission line to the microcomputer of the control unit. This resistor serves for current limitation in the very improbable event that the microcomputer wrongly reconfigures as an output the terminal to which the transmission line is connected as a result of a program error or as a result of an interference signal and outputs a high level via this output. In this case, current limitation is achieved by means of the resistor so that the output of the Schmitt trigger, and thus the enabling signal for programming, remain at low. It is thus ensured that undesired unlocking of the nonvolatile memory of the control unit—without external enabling of the programming—cannot occur.

It is advantageous for the device for programming the nonvolatile memory of the control unit according to the invention that only the terminal for the serial transmission line is required for the transmission of data between the external programming unit and the control unit and for outputting a necessary programming-enabling signal. A separate line is not required for the programming-enabling signal.

It is very advantageous that means are provided internally in the programming unit which apply high potential to the transmission line when the serial transmission line is connected. As a result, the quiescent potential of the transmission line corresponds to high potential so that the outlay in terms of circuitry for extracting the programming-enabling signal at the control unit can be kept small.

BRIEF DESCRIPTION OF THE DRAWING

The invention is illustrated in the drawing and explained in greater detail in the subsequent description.

DESCRIPTION OF THE PREFERRED EMBODIMENT

Figure 1:
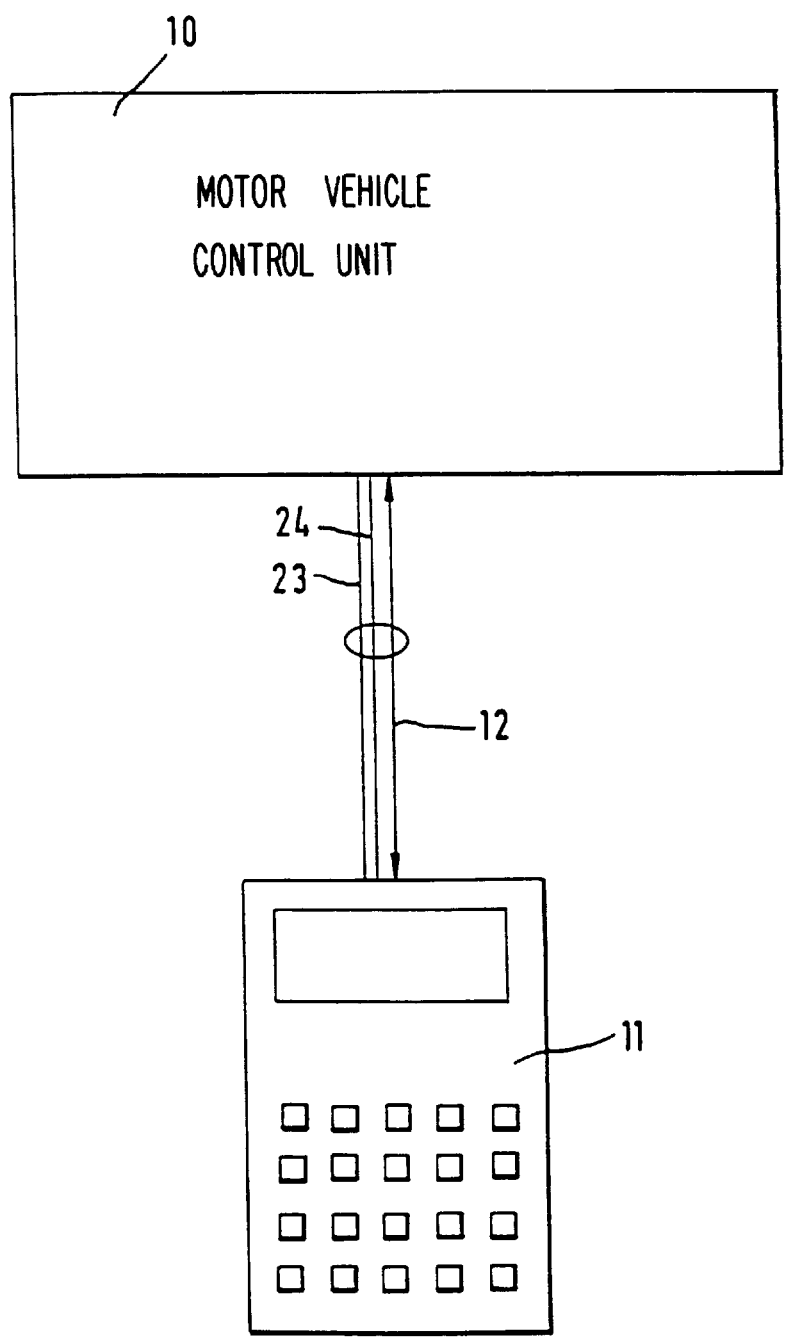
FIG. 1 shows the connection of a programming unit to a control unit.

FIG. 1 shows the connection of a control unit 10 to an external programming unit 11 via a serial transmission line 12. The battery voltage is fed from the control unit to the external programming unit via the connection line 23. The ground of the control unit 10 is connected to the ground of the programming unit 11 via the connection line 24. The programming process of the control unit 10 takes place e.g. at the end of the motor vehicle production line. Here, the control unit 10 is already installed in the motor vehicle. The control unit can be a control unit for the brakes, engine or transmission etc. Usually, such a control unit can be connected to external programming units via a diagnostic terminal. Instead of the external programming unit, an external test unit can also be connected to the diagnostic terminal of the motor vehicle.

Figure 2:
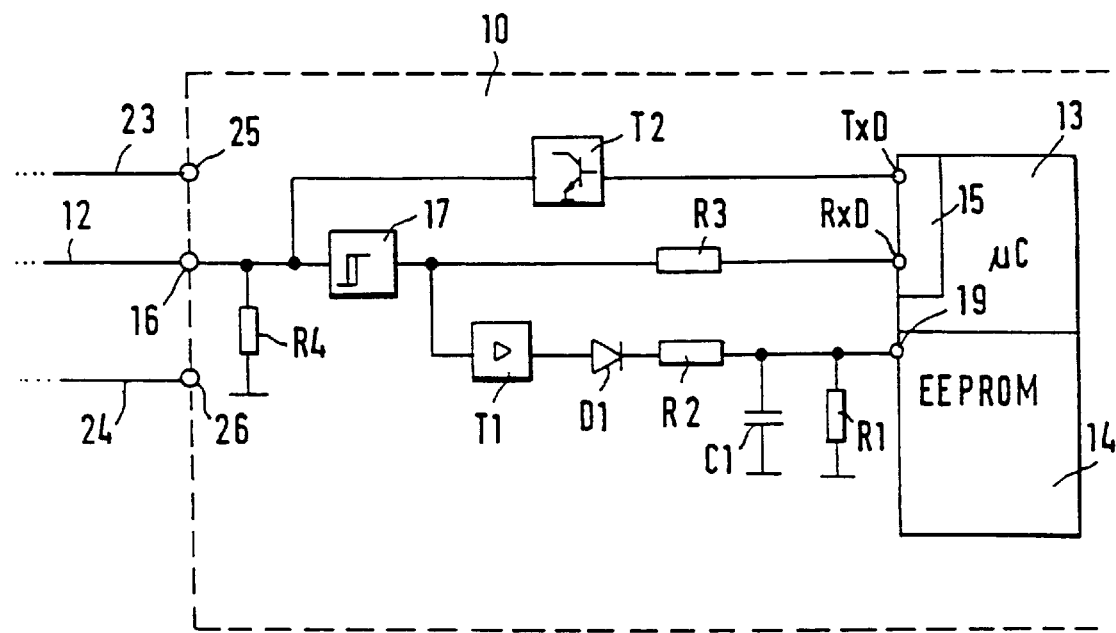
FIG. 2 shows a diagrammatic circuit diagram for the circuit arrangement according to the invention in the control unit.

FIG. 2 shows, with the reference number 13, the microcomputer of the control unit 10. The said microcomputer contains a serial interface 15. A nonvolatile, programmable memory 14 is provided realized integrated with the microcomputer or separately from the microcomputer. The nonvolatile memory 14 is realized in particular as a flash EPROM. In order to program the nonvolatile memory 14, an enabling signal must be applied to the nonvolatile memory 14. In the exemplary embodiment illustrated here, the nonvolatile memory 14 is constructed in such a way that a programming voltage of 5 V is sufficient for it. This voltage can simply be generated in the control unit or else be impressed on the control unit from outside. Further components of the control unit or of the microcomputer 13, such as input/output circuits and RAM memories are not illustrated individually for the sake of simplicity. A resistor R3 is connected to the RXD input of the serial interface 15 of the microcomputer 13. The resistor R3 is connected to a Schmitt trigger 17. On the input side the Schmitt trigger 17 is connected to the transmission line 12. The transmission line 12 can either be permanently connected here to the input of the control unit 16 and then to a separate diagnostic terminal inside the motor vehicle or it can also be connected to the input pin 16 of the control unit via a plug-in connection. The connection lines 23 and 24, also for connecting the control unit 10 to an external programming unit, are also illustrated. The battery voltage of the control unit is transmitted via the connection line 23 to the external programming unit 11. The ground terminal of the programming unit 11 is connected to the ground terminal of the control unit 10 via the connection line 24. These connections can also be plug-type connections. These connections may however also be permanently present at the control unit and lead to a separate diagnostic terminal in the motor vehicle, the connection of the external programming unit 11 then being made via a plug-in connection at the separate diagnostic terminal.

The serial transmission line 12 is connected internally in the control unit 10 to the RXD input of the microcomputer via the input pin 16, as already described. In this arrangement, an input resistor R4 is connected from the transmission line 12 to ground. In order to extract the program-enabling signal via the serial transmission line 12, a driver stage T1 is connected downstream of the Schmitt trigger 17. The output of the driver stage T1 is connected to a diode D1. The diode D1 is connected to the driver stage T1 in the transmitting direction. A resistor R2 is connected downstream of the diode D1. A direct connection then leads from the resistor R2 to the programming-enabling input 19 of the nonvolatile memory 14. A capacitor C1 is connected to the connection line from the resistor R2 to the programming-enabling input 19. A further resistor R1 is connected to ground parallel to the capacitor C1. A driver stage T2 is connected to the TXD input of the serial interface 15 of the microcomputer 13. Thus, the transmission line 12 serves both to transmit data from the external programming unit 11 to the control unit 10 and to transmit data from the control unit 10 to the external programming unit 11.

Figure 3:
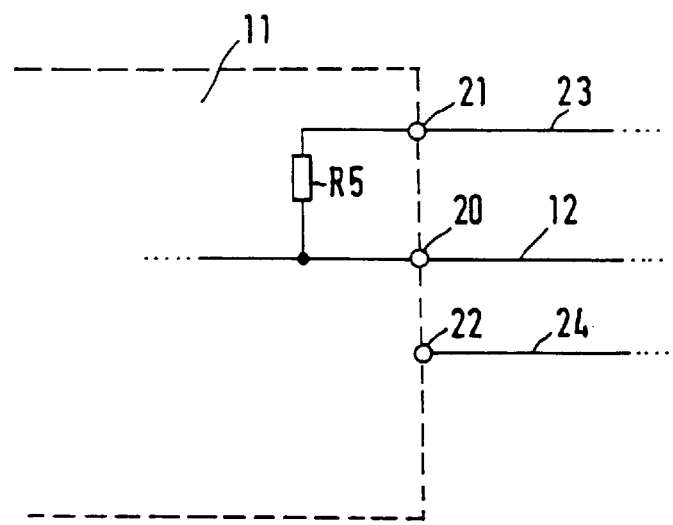
FIG. 3 shows a diagrammatic circuit diagram for the circuit arrangement according to the invention in the programming unit.

In FIG. 3 it is illustrated that a resistor R5 is connected to the transmission line 12 internally in the programming unit 11, which resistor R5 is also connected, at the other end, to the transmission line 23 for the battery voltage of the control unit 10. The connection lines 23, 24 and 12 are also detachably connected to the programming unit 11. This is indicated by the input pins 21, 20 and 22. Further components of the programming unit 11, such as for example the serial interface, microcomputer, memory etc., are not illustrated individually for the sake of simplicity.

The mode of operation of the circuit arrangement will be described in greater detail below. As long as the control unit 10 is still not connected to the external programming unit, low potential is present at the input pin 16 of the control unit. This is because the corresponding connection line is connected to the ground of the control unit via the resistor R4 (pull-down resistor). Thus, low potential is also present at the RXD input and also at the programming-enabling input 19 of the nonvolatile memory 14. Even if the capacitor C1 was previously still charged, it will discharge via the resistor R1 after a short time. By means of the input resistor R4 it is therefore ensured that high potential cannot be present at the programming-enabling input 19 during the normal operation of the vehicle. Thus, it is absolutely impossible for the nonvolatile memory to be programmed during the normal operation of the vehicle. It is also ensured by virtue of the fact that it is also impossible for the nonvolatile memory 14 to be programmed in the event of an incorrect program sequence (caused for example by electromagnetic interference). As soon as the external programming unit 11 is connected to the control unit 10, high potential is applied to the serial transmission line 12 via the resistor R5 (pull-up resistor). This leads to the capacitor C1 also being charged via the resistor R2. After the capacitor C1 is charged, high potential is therefore present at the programming-enabling input 19 and the nonvolatile memory 14 is unlocked for programming. At the start of programming a corresponding control instruction must be transmitted to the microcomputer 13 of the control unit by the programming unit 11.

The transmission of data between the control unit and external programming unit takes place in the form of individual data words. A data word comprises for example a start bit, eight data bits and a stop bit. The typical transmission rate for communication between the external programming unit and control unit is approximately 10 kBaud. At this transmission rate a bit therefore takes 100 microseconds. When a low bit is transmitted, the transmission line 12 is therefore occupied with a low level for approximately 100 microseconds. During the transmission of a high bit, the transmission line 12 is correspondingly occupied with a high level for 100 microseconds. Therefore, a high-frequency alternation of high and low levels takes place on the transmission line 12.

The Schmitt trigger 17 serves for signal preparation of the incoming signals. During the transmission of each low level via the transmission line 12, the capacitor C1 can discharge via the resistor R1. The timing constant of the RC element C1, R1 is therefore selected in such a way that the capacitor C1 can only discharge insignificantly during the transmission of individual low levels. The extreme case would be if there were an individual data word consisting of eight low bits. In this case, the capacitor C1 would therefore discharge during a time of roughly 1 millisecond. The timing constant of the RC element C1, R1 is then however dimensioned such that even in such a case a high level is still present at the programming-enabling input 19. The resistor R2 is selected such that the capacitor C1 can be completely charged during the time between the transmission of two data words, at which time high voltage is of course present on the transmission line 12. The driver stage T1 serves to relieve the output stage of the Schmitt trigger 17. Furthermore, it brings about isolation of the output signal of the Schmitt trigger 17 from the successive recharging processes of the capacitor C1.

During the transmission of data words from the control unit 10 to the external programming unit 11, the serial interface 15 drives the driver stage T2 via the TXD output. The transmission line 12 is successively pulled towards low potential by means of the driver stage T2 which has an open collector. It is advantageous to provide the driver stage T2 with open collector because as a result the control unit 10 itself cannot apply high voltage to the connection line at the input pin 16 if there is no external programming unit 11 connected.

There is a wide variety of possible modifications of the invention described. Thus, whether a resistor R4 (pull-down resistor) is connected to ground internally in the control unit 10 or whether, on the other hand, a resistor (pull-up resistor) is connected to the battery voltage of the control unit is dependent for example on the data transmission protocol. The quiescent potential on the transmission line 12 would correspond to a high level. The driver stage T1 of the control unit 10 would then have to be configured in an inverting manner in order to prevent inadvertent unlocking of the nonvolatile memory 14.

As a further embodiment it is also conceivable for the programming-enabling signal not to be fed directly to an input 19 of the nonvolatile memory 14 but rather to a separate component which subsequently generates the programming voltage for the nonvolatile memory 14. Such a component can be for example a charging pump which then generates the programming voltage (5 V or 12 V).

Further possible modifications are conceivable. Thus, it would for example also be possible for a plurality of control units to be installed in the motor vehicle, which control units can all be addressed via a common serial transmission line. In this case, when the external programming unit is connected the nonvolatile memories in the individual control units would all be unlocked together. The individual memories would then have to be successively programmed with different appropriate control instructions.

The external programming unit can for example also be a personal computer. The use of separate transmission lines for the transmission from the control unit to the external programming unit and from the external programming unit to the control unit would also be possible.

We claim:

1. A control unit comprising:
    a microcomputer (13),
    a programmable nonvolatile memory (14) connected with or integrated in the microcomputer (13),
    a serial interface (15) for the microcomputer (13) to which at least one serial data transmission line (12) can be connected over which data for programming the programmable nonvolatile memory (14) is received in the microcomputer from an external programming unit (11), and
    a low pass filter connected to a terminal (16) for said at least one serial data transmission line, said low pass filter including means for producing a signal for enabling said programming of the programmable nonvolatile memory (14) if said external programming unit is connected to the control unit via said at least one serial data transmission line (12).

2. The control unit as defined in claim 1, further comprising means for inputting said signal for enabling said programming of the programmable nonvolatile memory (14) to said microcomputer (13).

3. The control unit as defined in claim 1, further comprising means for inputting said signal for enabling said programming of the programmable nonvolatile memory to said programmable nonvolatile memory (14).

4. The control unit as defined in claim 1, further comprising means for inputting said signal for enabling said programming of the nonvolatile memory to a charging pump and wherein said charging pump includes means for applying a programming voltage to said programmable nonvolatile memory (14) in response to said signal.

5. The control unit as defined in claim 1, wherein said low pass filter comprises a first resistor (R2) connected to said terminal for said at least one serial transmission line (12) and a capacitor (C1) connected to ground downstream of said first resistor (R2).

6. The control unit as defined in claim 5, wherein said microcomputer (13) has a programming-enabling input (19) and a second resistor (R1) is connected to ground between said programming-enabling input (19) and said capacitor (C1).

7. The control unit as defined in claim 6, wherein said first resistor (R2) is connected between said programming-enabling input (19) and said terminal (16), said capacitor (C1) and said second resistor (R1) are each connected between ground and said programming-enabling input (19) and a third resistor (R4) is connected between said terminal (16) and said first resistor (R2).

8. The control unit as defined in claim 5, wherein said low pass filter includes an RC element having a timing constant so large that during transmission of a data word of said data said capacitor (C1) is not discharged to an extent that said signal for enabling programming decreases below a predetermined minimum value.

9. The control unit as defined in claim 5, wherein said first resistor (R2) has a resistance value so small that said capacitor (C1) is completely charged between transmissions of two data words of said data.

10. The control unit as defined in claim 5, further comprising a Schmitt trigger (17) for performing signal preparation of said signals, said Schmitt trigger being connected to said terminal (16).

11. The control unit as defined in claim 10, wherein said microcomputer (13) has a receiving input (RXD) and a fourth resistor (R3) connected between said receiving input (RXD) and said Schmitt trigger (17).

12. The control unit as defined in claim 5, further comprising a driver stage (T1) connected upstream of the first resistor (R2) to the first resistor (R2).

13. The device as defined in claim 1, wherein said control unit is a motor vehicle control unit.

14. A device for programming a programmable nonvolatile memory in a control unit (10), wherein said control unit comprises:

a microcomputer (13) connected with the programmable nonvolatile memory (14), a serial interface (15) for the microcomputer (13) to which at least one serial data transmission line (12) can be connected over which data for programming the programmable nonvolatile memory (14) is received in the microcomputer from an external programming unit (11), and a low pass filter connected to a terminal (16) for said at least one serial data transmission line, said low pass filter including means for producing a signal for enabling said programming of the programmable nonvolatile memory (14) if said external programming unit is connected to the control unit via said at least one serial data transmission line (12); and wherein said device comprises means for transmitting said signal enabling said programming to the control unit (10) via the at least one serial transmission line (12).

15. The device as defined in claim 14, wherein the external programming unit includes internal means for applying a high potential, as quiescent potential, to the at least one serial transmission line (17).

16. The device as defined in claim 15, wherein said means for applying said high potential comprises a resistor (RS) connected internally to a supply voltage in the external programming unit (11).

* * * * *